UNITED STATES PATENT OFFICE.

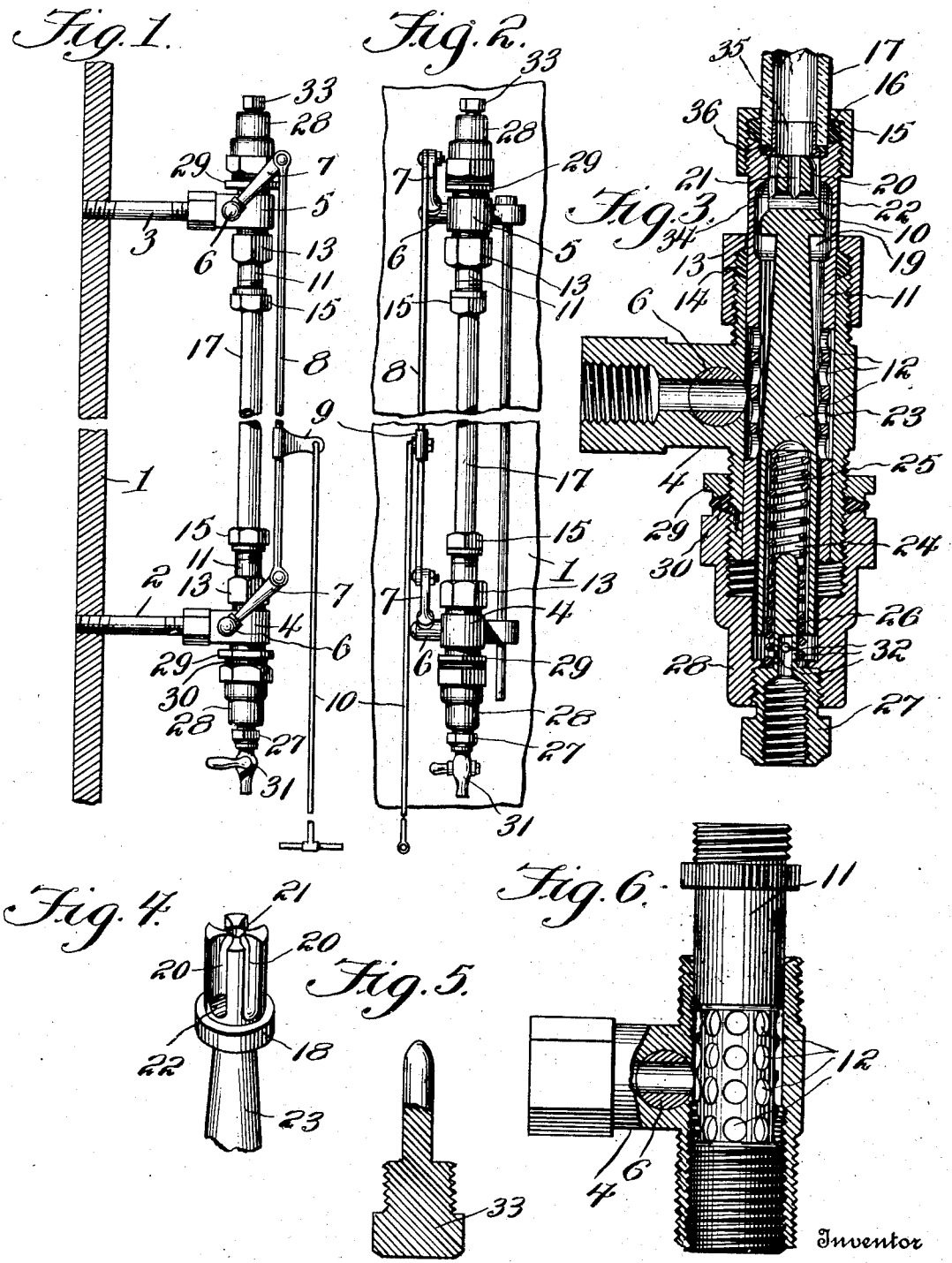
J. GEISINGER.
SAFETY VALVE FOR WATER GAGES.
APPLICATION FILED JUNE 18, 1912.
1,061,832. Patented May 13, 1913.

JOHN GEISINGER, OF NEWPORT NEWS, VIRGINIA.

SAFETY-VALVE FOR WATER-GAGES.

1,061,832.  Specification of Letters Patent.  Patented May 13, 1913.

Application filed June 18, 1912.  Serial No. 704,366.

*To all whom it may concern:*

Be it known that I, JOHN GEISINGER, a citizen of the United States, residing at Newport News, in the county of Warwick and State of Virginia, have invented new and useful Improvements in Safety-Valves for Water-Gages, of which the following is a specification.

This invention relates to water gages and the object of the invention is to provide a simple and efficient valve for automatically controlling the exit of steam or water from the boiler in case the glass breaks.

A further object of the invention is the provision of a device of this character having an adjustable valve casing and valve which permits ready connection of the device to glasses of different lengths, wherein should the glass become broken at one end and consequently shortened, the same glass could be applied and used by the aforesaid adjustment.

Further objects of this invention will appear as the following specific description is read in connection with the accompanying drawing, which forms a part of this case, and in which:—

Figure 1 is a side elevation. Fig. 2 is a front elevation. Fig. 3 is an enlarged detail vertical sectional view. Fig. 4 is a detail perspective view of the end of the valve. Fig. 5 is a sectional view of the cap closing plug. Fig. 6 is a detail elevation partly in section showing a modified form.

Referring more particularly to the drawing, 1 represents a boiler which has leading therefrom and communicating therewith the pipes 2 and 3. These pipes are connected to casings 4 and 5, both of which are similar in every respect, as will be hereinafter more particularly brought out, and, therefore, a description of one is sufficient. These casings have hand operated valves 6 rotatably mounted therein operated by levers 7 which are connected together by a link 8 having an arm 9 projecting therefrom, to which is connected the operating rod 10. Slidably mounted in each casing is a sleeve 11 having a plurality of perforations 12 which admit steam to the interior thereof. This sleeve is slidably held in the casing and, as shown in Fig. 3, is held in adjusted position by the packing nut 13 and packing 14. The outer end of the sleeve is suitably threaded to receive a packing nut 15 which draws the packing 16 into engagement with the end of the sleeve and also forces the same into engagement with the water glass 17, as will be readily understood by those versed in the art. Slidably mounted in the sleeve 11 is a valve 18 which operates in the counter-bored portion 19 and is provided with a plurality of grooves 20 in its end which merge into a central passage 21 extending longitudinally of the valve and communicating with a transverse aperture 22 formed therein. This valve is connected integrally with a valve rod 23 having a socket 24 in its rear end to receive the operating spring 25. This spring is mounted upon the projecting end of a pin 26 which is carried by the pet cock plug 27 threaded into the closing and adjusting cap 28 which is adjustably mounted upon the casing and is locked in steam tight engagement therewith by means of the locking nut 29 and the packing 30. A suitable pet cock 31 is mounted in the plug 27 and has communication with the casing through ports 32 formed in the plug. The upper casing is similar in every respect except that the closing cap 28 has its end closed by a plug 33. The spring 25 normally forces the valve to its seat 34 in the casing. The valve, however, is depressed by the glass, as shown in Fig. 3, which opens communication through the boiler, through the pipes 2 and 3, valves 6, openings 12, and to the glass. When the glass breaks, the spring acts to project the valve against the seat 34 and thereby automatically cuts off communication between the boiler and the glass. If the tube is shortened considerably by the breakage, the tension of the spring is maintained by screwing the closing cap 28 up on the casing after the sleeve 11 has been moved out of the casing a sufficient distance to properly connect with the short length of glass. This same adjustment may be accomplished by placing threads upon the sleeve 11, as shown in Fig. 6, or in any other suitable position thereon, suitable space being preferably left for the packing, such as is shown at 13 and 14 in Fig. 3, or the threads may be continuous and the packing used such as is shown at 30 in Fig. 3. Each end of the tube 17 has mounted therein a flanged ferrule 35 and interposed between the ferrule and the end of the tube is a cushion washer 36, as shown, so as to avoid direct contact of the glass with metal parts.

What is claimed is:—

1. In combination, separated valve casings, sleeves slidably mounted in the valve casings, means for holding the sleeves in adjusted position within the casings, a glass arranged between said sleeves, valves operating within the sleeves and held in position by said glass, springs for holding the valves against the glass, and means for adjusting the tension of the springs independently of the adjustment of the sleeves.

2. In combination separated valve casings, sleeves slidably mounted in said casings, means for holding the sleeves in adjusted position with the casings, a glass arranged between said sleeves, valves operating within the casings and held in position by the said glass, springs for holding the valves against the glass, means for adjusting the tension of the springs independently of the adjustment of the sleeves, and a petcock carried by the spring adjusting means and communicating with one of the casings.

In testimony whereof I affix my signature in presence of two witnesses.

JOHN GEISINGER.

Witnesses:
 JOHN W. MOONEY,
 ROBERT BROWN.